US011936826B2

(12) United States Patent
Nakayama et al.

(10) Patent No.: US 11,936,826 B2
(45) Date of Patent: Mar. 19, 2024

(54) IMAGE INSPECTOR FOR DETECTING AT LEAST ONE ABNORMALITY OF A RECORDED MEDIUM AND IMAGE FORMING SYSTEM INCORPORATING THE IMAGE INSPECTOR

(71) Applicants: Satoshi Nakayama, Kanagawa (JP); Tohru Matsumoto, Kanagawa (JP); Kohta Aoyagi, Kanagawa (JP); Ryosuke Ebinuma, Tokyo (JP); Ryoh Ishitsuka, Kanagawa (JP); Kimiharu Yamazaki, Kanagawa (JP); Tatsuya Ishii, Kanagawa (JP)

(72) Inventors: Satoshi Nakayama, Kanagawa (JP); Tohru Matsumoto, Kanagawa (JP); Kohta Aoyagi, Kanagawa (JP); Ryosuke Ebinuma, Tokyo (JP); Ryoh Ishitsuka, Kanagawa (JP); Kimiharu Yamazaki, Kanagawa (JP); Tatsuya Ishii, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/678,475

(22) Filed: Feb. 23, 2022

(65) Prior Publication Data
US 2022/0286572 A1    Sep. 8, 2022

(30) Foreign Application Priority Data

Mar. 5, 2021    (JP) .................... 2021-035472

(51) Int. Cl.
*H04N 1/00*    (2006.01)
*G03G 15/00*    (2006.01)
(52) U.S. Cl.
CPC ......... *H04N 1/00726* (2013.01); *G03G 15/50* (2013.01); *H04N 1/00037* (2013.01);
(Continued)

(58) Field of Classification Search
CPC .................................................. H04N 1/00726
(Continued)

(56) References Cited

U.S. PATENT DOCUMENTS

2011/0221852 A1* 9/2011 Yahata ............... G03G 15/5029
347/179
2017/0066262 A1* 3/2017 Kimura ............... B41J 2/16579
(Continued)

FOREIGN PATENT DOCUMENTS

EP    1011079 A1    6/2000
EP    3141393 A1 *  3/2017   .......... B41J 11/0095
(Continued)

OTHER PUBLICATIONS

Extended European Search Report dated Aug. 1, 2022 issued in corresponding European Appln. No. 22157302.5.

*Primary Examiner* — Jacky X Zheng
(74) *Attorney, Agent, or Firm* — Harness, Dickey & Pierce, P.L.C.

(57) ABSTRACT

An image inspector includes a recording device and circuitry. The reading device is configured to read an image on a recording medium. The circuitry is configured to determine whether the recording medium has a wrinkle and an edge folding based on a plurality of positions on the image on the recording medium read by the reading device satisfying a predetermined relation. The circuitry is configured to determine whether the recording medium has the wrinkle based on the predetermined relation, and then determine whether the recording medium has the edge folding based on the predetermined relation.

20 Claims, 10 Drawing Sheets

(52) U.S. Cl.
  CPC ..... *H04N 1/00074* (2013.01); *H04N 1/00092* (2013.01); *H04N 1/0057* (2013.01); *H04N 1/00633* (2013.01); *H04N 1/00737* (2013.01); *H04N 1/00779* (2013.01)

(58) Field of Classification Search
  USPC ........................................................ 358/1.14
  See application file for complete search history.

(56) References Cited

U.S. PATENT DOCUMENTS

| | | | |
|---|---|---|---|
| 2020/0099812 A1 | 3/2020 | Ishii | |
| 2020/0296243 A1 | 9/2020 | Aoyagi et al. | |
| 2021/0080888 A1 | 3/2021 | Ishii et al. | |
| 2021/0088948 A1 | 3/2021 | Hemmi et al. | |
| 2021/0097357 A1 | 4/2021 | Katoh et al. | |
| 2021/0163247 A1 | 6/2021 | Suzuki et al. | |
| 2021/0165355 A1 | 6/2021 | Yamazaki et al. | |
| 2021/0166096 A1 | 6/2021 | Yamazaki et al. | |
| 2021/0266423 A1 | 8/2021 | Ishii et al. | |
| 2022/0004138 A1* | 1/2022 | Okitsu | G03G 15/5062 |

FOREIGN PATENT DOCUMENTS

| | | |
|---|---|---|
| JP | 9-270908 | 10/1997 |
| JP | 6136296 B2 * | 5/2017 |
| JP | 2019-102824 | 6/2019 |

\* cited by examiner

- INTERSECTION POINT (X, Y): INTERSECTION OF EXTENDING LINE FROM LINE PASSING COORDINATE POINTS $(X_0, X_1)$ AND EXTENDING LINE FROM LINE PASSING COORDINATE POINTS $(X_n, X_{n+1})$
- END POINT E OF SHEET EDGE FOLDING IS A POINT SATISFYING $(X_{m+1} - X_m) = (X_{n+1} - X_n)$.

IMAGE INSPECTOR FOR DETECTING AT LEAST ONE ABNORMALITY OF A RECORDED MEDIUM AND IMAGE FORMING SYSTEM INCORPORATING THE IMAGE INSPECTOR

CROSS-REFERENCE TO RELATED APPLICATION

This patent application is based on and claims priority pursuant to 35 U.S.C. § 119(a) to Japanese Patent Application No. 2021-035472, filed on Mar. 5, 2021, in the Japan Patent Office, the entire disclosure of which is hereby incorporated by reference herein.

BACKGROUND

Technical Field

Embodiments of the present disclosure relate to an image inspector and an image forming system incorporating the image inspector.

Background Art

Currently, there are various types of techniques to detect abnormality of sheets. For example, a typical configuration detects deviation of an end of a sheet and calculates the amount of deviation, for the purpose of detecting a sheet edge folding. As another example, another typical configuration recognizes the outer edge shape of a recording medium and obtains the parallelism of at least a pair of two sides facing each other in the outer edge shape, for the purpose of detecting wrinkles of a sheet.

SUMMARY

Embodiments of the present disclosure described herein provide a novel image inspector including a recording device and circuitry. The reading device reads an image on a recording medium. The circuitry determines whether the recording medium has a wrinkle and an edge folding based on a plurality of positions on the image on the recording medium read by the reading device satisfying a predetermined relation. The circuitry determines whether the recording medium has the wrinkle based on the predetermined relation, and then determine whether the recording medium has the edge folding based on the predetermined relation.

Further, embodiments of the present disclosure described herein provide an image forming system including the above-described image inspector.

BRIEF DESCRIPTION OF THE SEVERAL VIEWS OF THE DRAWINGS

Exemplary embodiments of this disclosure will be described in detail based on the following figures, wherein.

Figure 1:
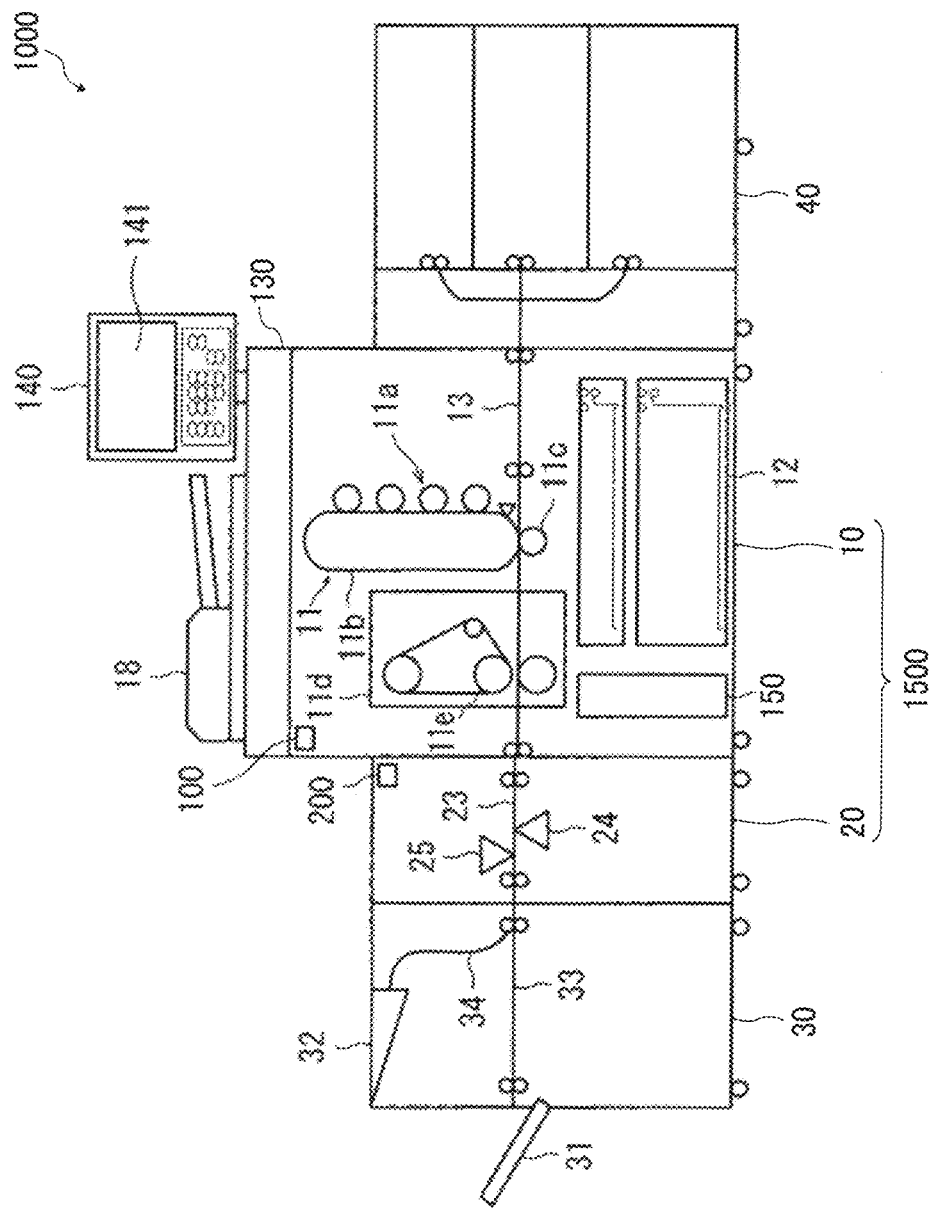
FIG. 1 is a diagram illustrating a schematic mechanical configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Descriptions are given of an image inspector and an image forming system according to an embodiment of the present disclosure, with reference to the following figures. In the present embodiment, the image inspector and the image forming system incorporating the image inspector include the following features when detecting defects in the sheet. That is, when determining a defect or defects on a sheet, a sheet wrinkle is firstly determined, then a sheet edge folding is determined. Descriptions are given of the configuration and functions of an image inspector and an image forming system incorporating the image inspector according to the present disclosure, with reference to the drawings. Note that the following descriptions include a configuration in which a sheet is used as an example of a recording medium but, for example, a sheet-like recording medium other than a sheet may be applied.

FIG. 1 is a diagram illustrating a schematic mechanical configuration of an image forming system according to an embodiment of the present disclosure.

As illustrated in FIG. 1, the image forming system 1000 includes an image forming apparatus 10, an image reading device 20, a post-processing apparatus 30, and a sheet feeder 40. The image forming apparatus 10 forms an image on a sheet P. The sheet feeder 40 is disposed upstream from (previous step of) the image forming apparatus 10 in a conveyance direction of the sheet P and is connected to the image forming apparatus 10. The image reading device 20 is disposed downstream from (following step of) the image forming apparatus 10 in the conveyance direction of the sheet P and is connected to the image forming apparatus 10. Further, the post-processing apparatus 30 is disposed downstream from (following step of) the image reading device 20 in the conveyance direction of the sheet P and is connected to the image reading device 20. Each housing of the devices and apparatuses are electrically and mechanically connected to each other, so that the devices and apparatuses communicate with each other and convey a sheet P. The image forming apparatus 10 and the image reading device 20 are included in an image inspector 1500. In other words, the image forming system 1000 includes the image inspector 1500.

Note that the image forming system 1000 according to the present embodiment includes the image forming apparatus 10, the sheet feeder 40, the image reading device 20, and the post-processing apparatus 30, as described above. However, the present disclosure may be applied to an image forming system that includes the image forming apparatus 10 alone, the image forming apparatus 10 and another device, or the image reading device 20 alone. Further, the image forming apparatus 10 described below forms an image on a sheet and determines sheet wrinkles or sheet edge folding of the sheet. However, the image forming apparatus 10 may form an image on a sheet, and an image inspector provided with the image forming apparatus 10 (or image inspector separate from the image forming apparatus 10) may determine sheet wrinkles or sheet edge folding of the sheet.

The sheet feeder 40 includes multiple sheet feed trays each loading sheets P. The sheets P loaded in each of the multiple sheet feed trays are supplied to the image forming apparatus 10 that is disposed downstream from (following step of) the sheet feeder 40 in the conveyance direction of the sheet P.

A conveyance passage 13 is provided inside the housing of the image forming apparatus 10. Each sheet P fed from the sheet feeder 40 or an in-house sheet feeder 12 is conveyed from upstream toward downstream in the conveyance direction of the sheet P along the conveyance passage 13. The image forming apparatus 10 includes an image forming device 11 that is disposed in the middle of the conveyance passage 13. The image forming device 11 forms an image on a sheet P.

The image forming device 11 includes photoconductors 11a for respective colors of cyan, magenta, yellow, and black. A charger, a laser diode (LD), a developing unit, and a cleaner are disposed around each of the photoconductors 11a in the image forming device 11. The image forming device 11 further includes an intermediate transfer belt 11b, a secondary transfer unit 11c, a fixing unit 11d, and a fixing roller 11e. The intermediate transfer belt 11b is disposed at a position to contact the photoconductors 11a of the respective colors. The secondary transfer unit 11c is disposed at a position facing the intermediate transfer belt 11b along the conveyance passage 13. The intermediate transfer belt 11b contacts a sheet P that is conveyed along the conveyance passage 13, at the position facing the secondary transfer unit 11c. The fixing unit 11d includes the fixing roller 11e and is disposed downstream from the secondary transfer unit 11c in the conveyance direction of the sheet P along the conveyance passage 13.

In a case in which an image is formed on a sheet P, after each of the photoconductors 11a is uniformly charged by the charger, laser light is irradiated from the LD to the photoconductors 11a to form respective latent images on the photoconductors 11a. The respective latent images on the photoconductors 11a are developed into respective toner images by the respective developing devices. Then, the toner images on the respective photoconductors 11a are transferred onto the surface of the intermediate transfer belt 11b to form a composite toner image. By so doing, the composite toner image on the intermediate transfer belt 11b is transferred onto a sheet P at the secondary transfer unit 11c. After an image is formed on the sheet P, the sheet P is conveyed along the conveyance passage 13 to the fixing unit 11d. In the fixing unit 11d, the image on the sheet P is fixed to the sheet P.

Although the image forming device 11 performs color image formation in the present embodiment, the image forming device 11 may perform monochrome image formation such as black image formation in the present disclosure. Further, sheet reverse passages may be provided at positions before and after the image forming device 11 to perform reverse conveyance of a sheet P, so that image formation is performed on both sides of the sheet P. In addition, the image forming apparatus 10 includes a control panel 140 on an upper portion of the housing. The control panel 140 includes a liquid crystal display (LCD) 141 having a touch panel, and a group of operation keys such as ten keys. The control panel 140 displays information and receive an input of an operation. The control panel 140 functions as a display and an operation unit.

In the present embodiment, the control panel 140 includes the operation unit and the display integrated with each other as a single unit. However, the operation unit and the display may not be integrated with each other. For example, the operation unit may be a mouse, a tablet, or a terminal. In addition, the LCD 141 may be movable.

An automatic document feeder (ADF) 18 and a scanner 130 are provided in the upper portion of the housing of the image forming apparatus 10. The ADF 18 is disposed above the scanner 130, at a position where the control panel 140 is not disposed. The ADF 18 automatically feeds an original document (or original documents) set on an original document loading table. The original document (or the original documents) fed and conveyed by the ADF 18 is read by the scanner 130 illustrated in FIG. 2. The original document (or the original documents) may be read on an exposure glass. The scanner 130 may set and read a printed document output from the image forming system 1000. For example, the scanner 130 sets and reads a sheet P on which an image for printing or an image for adjusting is formed is to obtain a read image. In this case, the scanner 130 corresponds to an image reader according to the present disclosure.

The image forming apparatus 10 further includes an image controller 100. The image controller 100 controls the overall image forming system 1000 and includes a central processing unit (CPU) and components and devices including a memory. Note that the image controller 100 is not limited to an image controller provided in the housing of an image forming apparatus and may be provided to be outside of the housing of an image forming apparatus. The program operating on the CPU includes the program of the present disclosure.

The image reading device 20 includes a conveyance passage 23. The sheet P fed from the image forming apparatus 10 is conveyed along the conveyance passage 23. The downstream side of the conveyance passage 23 is connected to the post-processing apparatus 30 disposed downstream from the image reading device 20 in the conveyance direction of the sheet P. Image readers 24 and 25 are disposed near the middle of the conveyance passage 23. The image reader 24 reads an image on the bottom face (second face) of a sheet P that is conveyed via the conveyance passage 23. The image reader 25 reads an image on the top face (first face) of the sheet P. The image reader 24 is disposed upstream from the image reader 25 in the conveyance direction of the sheet P.

Each of the image readers 24 and 25 may include a line sensor such as a charge coupled device (CCD) sensor or a complementary metal-oxide-semiconductor (CMOS) sensor, so as to read an image of a sheet P conveyed in the conveyance passage 23 over the whole direction intersecting the conveyance direction of the sheet P. A reading result read by the image reader 24 or the image reader 25 is temporarily sent to the reading controller 200 included in the image reading device 20, and then is transmitted from the reading controller 200 to the image controller 100. The image controller 100 determines whether wrinkles have occurred in the sheet P based on the reading result. The reading result may be a result obtained by reading one side of the sheet P or both sides of the sheet P.

In the present embodiment, the images on the front and back sides (first and second faces) of the sheet P may be read by two image readers, but the number of image readers is not particularly limited. For example, a single image reader may be provided and a reverse conveyance passages may be provided before and after the image reader to perform reverse conveyance of a sheet P so that images on the front and back sides (first and second faces) of the sheet P are read by the single image reader.

In the present embodiment, the reading result is transmitted to the image controller 100 so that the image controller 100 determines whether the sheet P is wrinkled. However, the reading controller 200 included in the image reading device 20 may determine whether the sheet P is wrinkled. The determination result may be transmitted to the image controller 100.

The post-processing apparatus 30 includes a conveyance passage 33 and conveys the sheet P fed from the image reading device 20 downstream in the conveyance direction of the sheet P. A post-processing device is provided in the middle of the conveyance passage 33. The post-processing device performs a predetermined post-processing operation, for example, a stapling operation or a punching operation. The post-processing device further performs the post-processing operation including a folding operation, for example, at least one of letter fold-in, saddle stitching, Z-fold, gate fold, or French fold. The post-processing device may perform multiple post-processing operations.

Further, a conveyance passage 34 is branched from the conveyance passage 33. The conveyance passage 33 is connected to a first sheet ejection unit 31, and the conveyance passage 34 is connected to a second sheet ejection unit 32. The sheet P on which the post-processing operation is performed is ejected to the first sheet ejection unit 31. The sheet P on which the post-processing operation is not performed is ejected to the second sheet ejection unit 32. When it is determined that the sheet P is wrinkled, the wrinkled sheet P may be ejected to a sheet ejection destination different from a sheet ejection unit for a sheet P without wrinkles. A sheet P on which the post-processing operation is not performed may be ejected to the second sheet ejection unit 32.

Although the image forming system 1000 includes the image reading device 20, the image reading device 20 may be provided inside the housing of the image forming apparatus 10, or the image forming apparatus and the image reading device may not be mechanically connected to each other. The image forming system 1000 according to the present disclosure may or may not include an image reader. Further, the image forming system 1000 according to the present disclosure may or may not include an image forming device.

In the present embodiment, when a sheet P is fed from the sheet feeder 40 and passes the image forming device 11 in the housing of the image forming apparatus 10, the image reading device 20, and the post-processing apparatus 30, and is ejected to the first sheet ejection unit (sheet ejection tray) 31 or the second sheet ejection unit 32, the sheet P travels in a conveyance passage (and a mechanism that conveys a sheet P through the conveyance passage). Such a conveyance passage (and a mechanism) may be referred to as a medium conveyor. Further, the image reading device 20 may be referred to as an inline sensor or a reading unit.

Next, a description is given of determination of a sheet edge folding and determination of sheet wrinkles according to the present embodiment. The determination of a sheet edge folding may be determined, for example, as follows.

Figure 2:
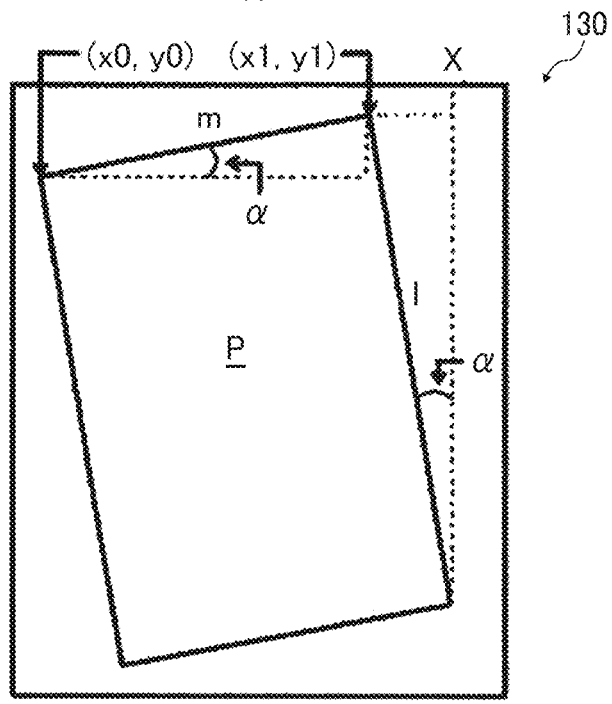
FIG. 2 is a diagram illustrating a state of a sheet according to an embodiment of the present disclosure.

FIG. 2 is a diagram illustrating a state of a sheet P according to an embodiment of the present disclosure, describing a cutting unit in the image controller 100, in other words, a sheet cutting position calculating unit. First, for example, when the state of the sheet P is (y1−y0)>0, that is, the sheet P is skewed upward to the right, the positions of the left and right upper ends of the sheet P are (x0, y0) and (x1, y1), respectively, the following equation is satisfied. In the following equations, "l" represents the sheet length in the conveyance direction of the sheet, "m" represents the sheet length in a direction orthogonal to the conveyance direction of the sheet, in other words, in the width direction of the sheet, and "α" represents an angle with respect to the conveyance direction of the sheet.

$$\frac{X - x1}{1} = \sin\alpha \qquad \text{Equation 1}$$

$$\therefore X = l\sin\alpha + x1 \text{ or}$$

$$\sin\alpha = \frac{y1 - y0}{m}. \qquad \text{Equation 2}$$

Based on Equation 1 and Equation 2, the following equation is satisfied.

$$X = 1 \times \frac{y1 - y0}{m} + x1 \text{(dot)}. \qquad \text{Equation 3}$$

According to Equation 3, the x dot value X at the rightmost end is obtained.

Figure 3:
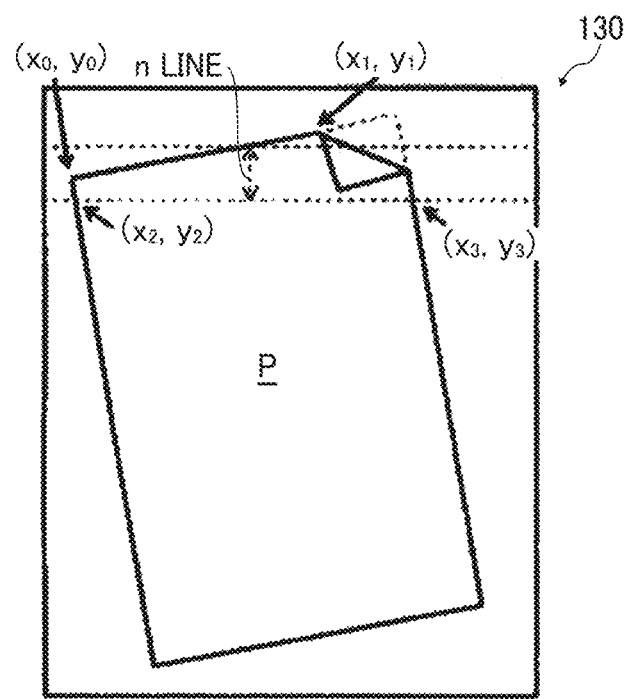
FIG. 3 is a diagram illustrating another state of a sheet according to an embodiment of the present disclosure.

FIG. 3 is a diagram illustrating another state of a sheet P according to an embodiment of the present disclosure, describing a process performed in the image controller 100, in other words, a sheet edge folding detection unit.

When the X coordinate increment and the Y coordinate increment ratio of the left edge (x2, y2) and the right edge (x3, y3) below the upper end of the sheet P by n lines are not equal (or exceed a certain value), that is, when the equation (x2−x0):(x3−x1)≠(y0−y2):(y1−y3) is satisfied, the state of the sheet P is regarded as a sheet edge folding.

Figure 4A:
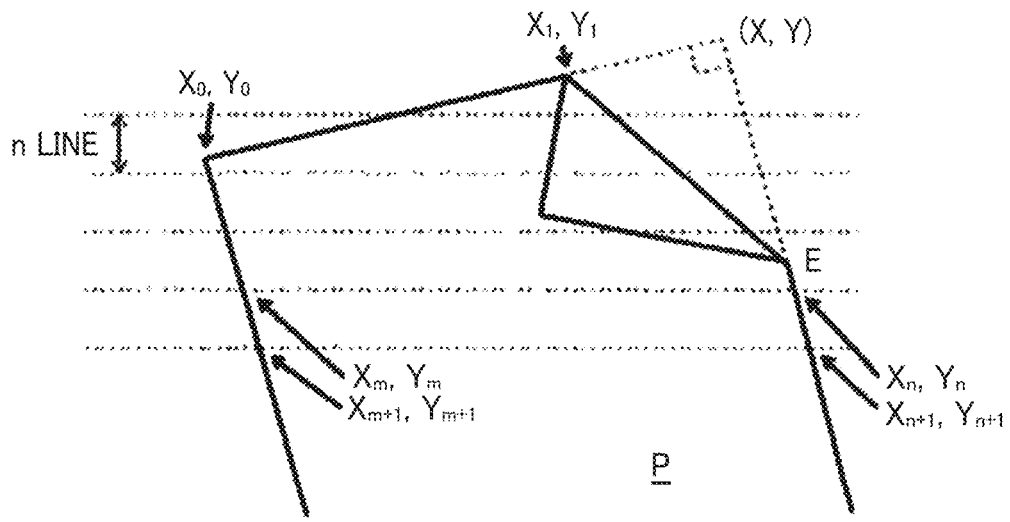
FIG. 4A is a diagram illustrating yet another state of a sheet according to an embodiment of the present disclosure.

FIG. 4A is a diagram illustrating yet another state of a sheet P according to an embodiment of the present disclosure, describing a process of a calculating unit of the original edge position of the sheet P having a sheet edge folding as illustrated in FIG. 3, to be more specific, an edge detecting method of the left and right edges and a calculating processing unit of the left and right upper edges of the sheet P having an edge folding (both performed in the image controller 100).

Figure 4B:
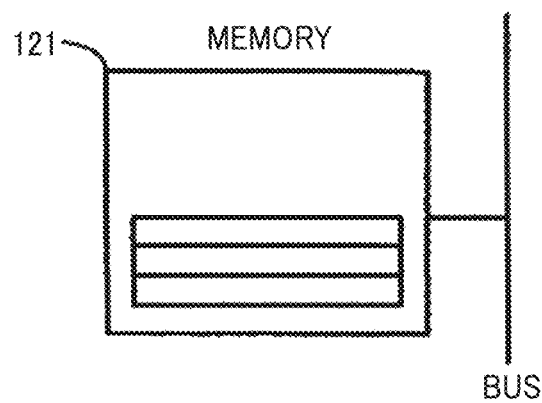
FIG. 4B is a view of a memory and units near the memory, according to an embodiment of the present disclosure.

FIG. 4B is a view of a memory and units near the memory, according to an embodiment of the present disclosure.

For example, when the upper right edge is folded as illustrated in FIG. 4A, the positions detected by an upper edge detection unit (sheet leading end detection unit) are the left coordinates (x0, y0) and the right coordinates (x1, y1). The above-described calculations are performed, for example, by using a memory 121 illustrated in FIG. 4B. The memory 121 is connected to the CPU via a path.

When the left and right edges located below by n lines are detected by the left and right edge detector, the value "n" of the n lines is obtained by lowering lines until the X coordinate increment and the Y coordinate increment become equal to each other. Then, when the increments at the left edge coordinates (xm, ym) and the right edge coordinates (xn, yn) of the previous line become equal to the increments at the left edge coordinates (xm+1, ym+1) and the right edge coordinates (xn+1, yn+1) of the subsequent line, the right edge coordinates (xn, yn) of the line is set as the end position of the sheet edge folding of the sheet P.

That is, when the increment ratios of the left edge and the right edge become equal, the position may be regarded as the end position of the sheet edge folding of the sheet P, so that the right upper edge to be obtained is an intersection point X of a straight line (extending line) connecting two coordinate points (x0, y0) and (x1, y1) and a straight line (extending line) connecting two coordinate points (xn, yn) and (xn+1, yn+1) after the end point E of the sheet edge folding of the sheet P, as illustrated in FIG. 4A. The end point E of the sheet edge folding is a point satisfying (Xm+1−Xm)= (Xn+1−Xn). In other words, the following equations are satisfied.

$$\frac{Y_1 - Y_0}{X_1 - X_0} x + \left(Y_0 - \frac{X_0(Y_1 - Y_0)}{X_1 - X_0}\right) = \qquad \text{Equation 4}$$

$$\frac{Y_{n+1} - Y_n}{X_{n+1} - X_n} x + \left(Y_n - \frac{X_n(Y_{n+1} - Y_n)}{X_{n+1} - X_n}\right)$$

$$x = \frac{\left(Y_0 - \frac{X_n(Y_{n+1} - Y_n)}{X_{n+1} - X_n}\right) - \left(Y_0 - \frac{X_0(Y_1 - Y_0)}{X_1 - X_0}\right)}{\frac{Y_1 - Y_0}{X_1 - X_0} - \frac{Y_{n+1} - Y_n}{X_{n+1} - X_n}}.$$

Equation 5

Accordingly, $$y = \frac{Y_1 - Y_0}{X_1 - X_0} * \frac{\left(Y_n - \frac{X_n(Y_{n+1} - Y_n)}{X_{n+1} - X_n}\right) - \left(Y_0 - \frac{X_0(Y_1 - Y_0)}{X_1 - X_0}\right)}{\frac{Y_1 - Y_0}{X_1 - X_0} - \frac{Y_{n+1} - Y_n}{X_{n+1} - X_n}} +$$

$$\left(Y_0 - \frac{X_0(Y_1 - Y_0)}{X_1 - X_0}\right).$$

Thereafter, by using the upper edge position of the edge-folded sheet P calculated in this manner, the cut-out position X is calculated by the same process as the process described with reference to FIG. 2 and is notified to a higher level controller.

In addition, the wrinkle of the sheet may be determined, for example, as follows. Specifically, after the sheet P is read, the outer edge shape of the sheet P is recognized by using an obtained reading result, so that a distance D1 between sheet edges in the intersection direction of the sheet P is calculated at any position in the conveyance direction of the sheet P in the outer edge shape of the sheet P, and a distance D2 between the sheet edges in the intersection direction of the sheet P is calculated at a position different from the calculated position. Note that the distance between the sheet edges in the intersection direction of the sheet P is a distance between two sides facing each other along the conveyance direction of the sheet P. The positions at which the distances D1 and D2 are calculated are not particularly limited, but the measurement position is determined based on the distance from the leading end corner of the sheet P.

Figure 5:
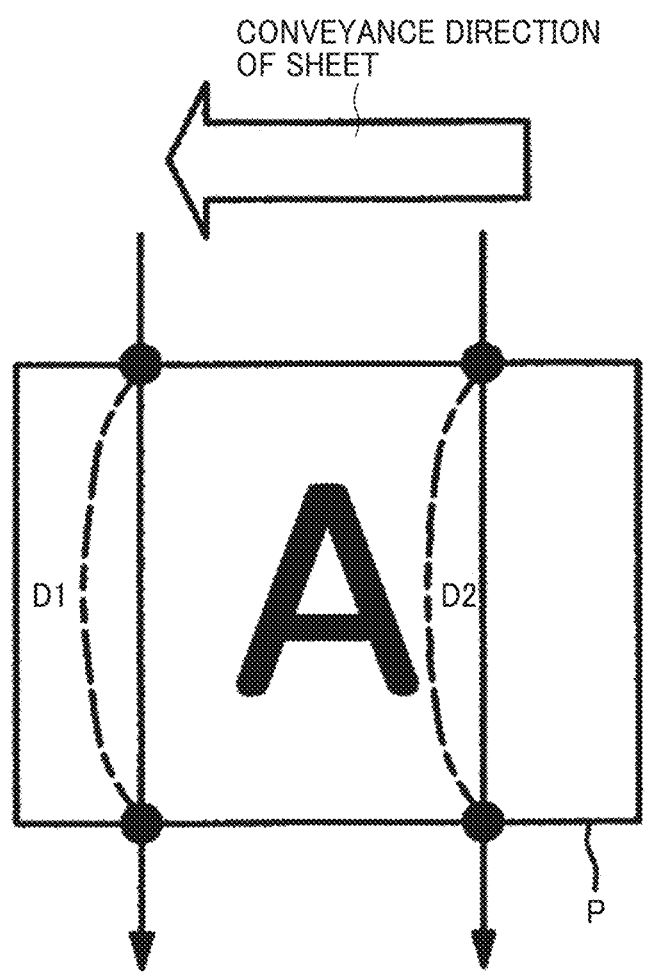
FIG. 5 is a diagram illustrating a method of measuring a distance between edges of a sheet, according to an embodiment of the present disclosure.

FIG. 5 is a diagram illustrating a method of measuring a distance between edges of a sheet P, according to an embodiment of the present disclosure.

That is, FIG. 5 illustrates an overview of the calculation position of the distance between the sheet edges.

The distances D1 and D2 are measured at positions such that the distances D1 and D2 are parallel to each other. In the example of FIG. 5, the distance between the sheet edges is measured at two positions. However, in addition to this distance, the distance between the sheet edges may be calculated at another position to obtain the parallelism.

In this example, sheet wrinkles are determined based on whether two sides along the conveyance direction of the sheet P are parallel to each other. Alternatively, whether two sides along the intersection direction of the sheet P are parallel to each other is determined, and then whether there are wrinkles on a sheet P is determined based on the determination result. By combining these determination results, the determination accuracy may be enhanced. In addition, the operation after the determination of sheet wrinkles is not particularly limited, and the sheet P on which the wrinkle is detected may be ejected as a waste sheet P to a sheet ejection destination different from a regular sheet ejection unit (tray) or the image formation may be stopped at the time at which the sheet wrinkles are detected. Further, when sheet wrinkles that allow continuous output of sheets P are serially generated by the predetermined number of sheets or by the predetermined number of times (frequency), the output operation of sheets P may be stopped.

In the above-described example, the occurrence of sheet wrinkles is determined based on the parallelism of two sides facing each other. However, the occurrence of sheet wrinkles may be determined based on another factor in addition to the parallelism. In the following example, sheet wrinkles are determined based on whether there is a continuous density change in the conveyance direction of the sheet P in the read image.

Figure 6:
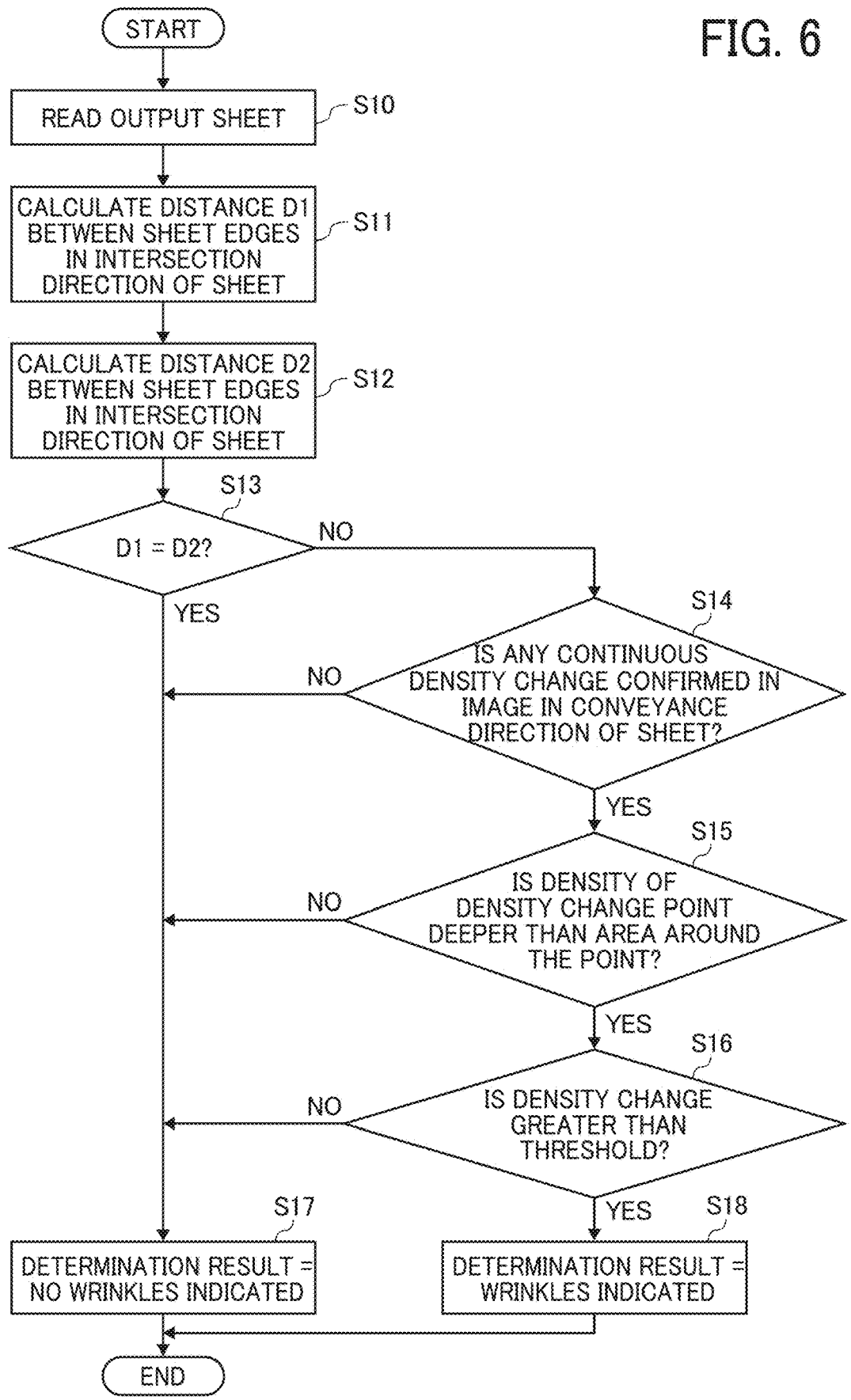
FIG. 6 is a flowchart of a procedure of determining occurrence of sheet wrinkles, according to another embodiment of the present disclosure.

A description is given of the procedure of the above-described operations, with reference to the flowchart of FIG. 6.

FIG. 6 is a flowchart of the procedure of determining occurrence of sheet wrinkles, according to another embodiment of the present disclosure.

Note that the following procedure is executed under the control of the image controller 100.

First, the image reader reads an output sheet P (step S10). When reading the output sheet P, a front face (first face) alone of the sheet P may be read even in the duplex printing in which images are printed on both the front and back face (first and second faces) of the sheet P. After the sheet P is read, the outer edge shape is recognized using the obtained reading result. Then, the distance D1 between the sheet edges in the intersection direction of the sheet P is calculated at any position in the outer edge shape (step S11). Then, the distance D2 between the sheet edges in the intersection direction of the sheet P is calculated at a position different from the position in step S11 (step S12).

After the distances D1 and D2 between the respective sheet edges are calculated, it is determined whether the relation of the distances D1 and D2 is expressed as D1=D2 is satisfied (step S13). When the relation of the distances D1 and D2 is expressed as D1=D2 (YES in step S13), two sides facing each other along the conveyance direction of the sheet P are parallel to each other. As a result, it is determined that the determination result indicates that there is no sheet wrinkle (step S17), and the procedure ends. By contrast, when the relation of the distances D1 and D2 is not expressed as D1=D2 (NO in step S13), two sides facing each other along the conveyance direction of the sheet P are not parallel to each other. As a result, it is determined that the determination result indicates that there may be a sheet wrinkle, and it is determined whether a continuous density change is confirmed in the conveyance direction of the sheet P in the read image (step S14). When a continuous density change is confirmed in the conveyance direction of the sheet P in the read image (YES in step S14), it is determined that the continuous density change is caused by sheet wrinkle. According to this determination, it is determined whether the density change point is deeper than the area around the density change point (step S15).

When a continuous density change is not confirmed in the conveyance direction of the sheet P in the read image (NO in step S14), it is determined that the determination result indicates that no sheet wrinkle is confirmed (step S17), and the procedure ends. When the density change point is not deeper than the area around the density change point (NO in step S15), it is determined that the determination result indicates that no sheet wrinkle is confirmed (step S17), and the procedure ends. By contrast, when the density change point is deeper than the area around the density change point (YES in step S15), it is determined whether the density change is longer (greater) than the threshold value (step S16). The threshold value may be set appropriately and may be set from values, for example, experience values.

When the density change is equal to or smaller than the threshold value (NO in step S16), it is determined that the density change is caused by a factor other than sheet wrinkles and the determination result indicates that there is no sheet wrinkle (step S17), and the procedure ends. By contrast, when the density change is longer than the threshold value (YES in step S16), it is determined that a sheet wrinkle has occurred (step S18), and the procedure ends. According to the above-described procedure, it is determined whether a sheet wrinkle is occurred due to a density change of an image in addition to the parallelism. As a result, this determination enhances the determination accuracy effectively.

Wrinkles on a sheet P are likely to occur when an image on the sheet P is fixed by a fixing roller. The fixing roller is used to apply heat and pressure to a sheet P based on the temperature and pressure set in advance to fix an image to the sheet P. However, when wrinkles occur on the sheet P, the fixing pressure, the fixing temperature, or both are not appropriate. It is likely that these factors cause such wrinkles on the sheet P. In order to address this inconvenience, when occurrence of wrinkles on the sheet P is confirmed, the mechanical setting that is considered to cause the wrinkles on the sheet P may be adjusted. Note that the adjustment of the mechanical setting may be performed when sheet wrinkles continuously occur by a predetermined number of sheets P or in a predetermined number of times (frequency), or the mechanical setting may be controlled so as to be performed by an operation of the user.

Although the determination of sheet edge folding and the determination of sheet wrinkles are performed as described above, the determination of sheet edge folding and the determination of sheet wrinkles may be performed simultaneously as described below. The following description is given of a method of determining sheet edge folding and sheet wrinkles simultaneously. In the following description, by providing separate measurement points (positions) for determining each sheet defect, the sheet edge folding and the sheet wrinkles are simultaneously determined.

Figure 7:
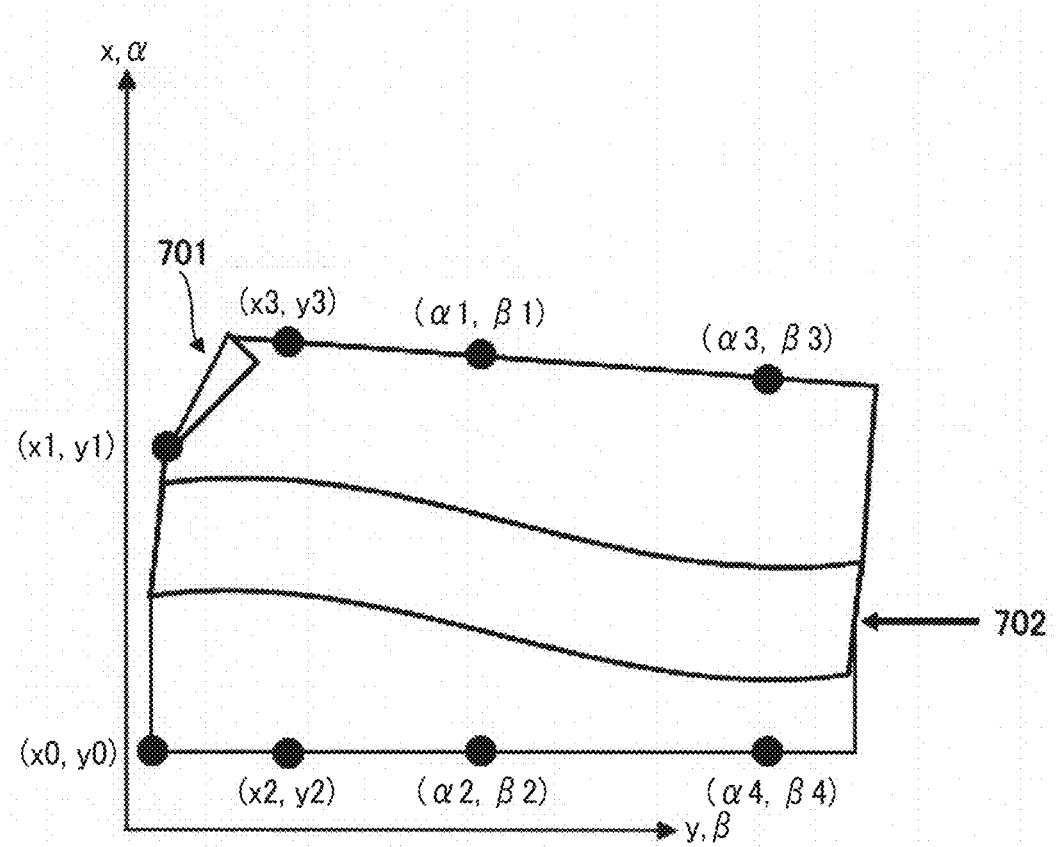
FIG. 7 is a diagram illustrating a sheet on which a method of simultaneously determining a sheet edge folding and sheet wrinkles is performed.

FIG. 7 is a diagram illustrating a sheet P on which a method of simultaneously determining sheet edge folding and sheet wrinkles is performed.

As illustrated in FIG. 7, the image controller 100 sets the measurement positions of four (x, y) coordinates for determining sheet edge folding and the measurement positions of four ($\alpha$, $\beta$) points for detecting sheet wrinkles, as feature points in an image on the sheet P read by the image reading device 20 that functions as an inline sensor. In FIG. 7, the feature points of (x0, y0), (x1, y1), (x2, y2), and (x3, y3) are set for determining sheet edge folding, and the feature points of ($\alpha$1, $\beta$1) ($\alpha$2, $\beta$2), ($\alpha$3, $\beta$3), and ($\alpha$4, $\beta$4) are set for detecting sheet wrinkles.

The image controller 100 determines that a sheet edge folding 701 has occurred when the relation of these feature points satisfies the expression (x2−x0):(x3−×1)≠(y0−y2):(y1−y3) illustrated in FIG. 7 and determines that a sheet wrinkle 702 has occurred when the relation of these feature points satisfies the expression $(\beta1-\beta3)\neq(\beta2-\beta4)$ is satisfied. That is, when these conditions are satisfied, it is determined that a defect due to both sheet edge folding and sheet wrinkle has occurred. Note that "x" and "α" represent the coordinates in the main scanning direction, and "y" and "β" represent the coordinates in the sub-scanning direction.

The image controller 100 stores each of the determination results in a storage area such as a memory and causes a sheet P that is determined as a defective sheet P to be ejected to a tray different from a regular sheet ejection unit (tray) by an optional setting. For example, the image controller 100 causes a sheet P that is not determined as a defective sheet P to be ejected to the first sheet ejection unit (tray) 31 of the post-processing apparatus 30 and causes a sheet P that is determined as a defective sheet P to be ejected to the second sheet ejection unit 32 of the post-processing apparatus 30. Further, when it is determined that there is a defective sheet P, the image controller 100 may output information indicating the determination of a defective sheet P to a display unit such as a display to notify the user.

In the above-described method, in particular, when sheet wrinkles alone are generated, it is also determined in calculation that a sheet edge folding is generated. In order to address this inconvenience, the image controller 100 performs determinations in a two-step manner. Specifically, the image controller 100 first determines whether there is a sheet wrinkle, and then, when no sheet wrinkles are recognized, the image controller 100 then determines whether there is a sheet edge folding. That is, when the defect of the sheet P is determined, determination of sheet wrinkles is performed, and then determination of a sheet edge folding is performed. By so doing, the determination of sheet wrinkles and the determination of the sheet edge folding are separated.

Figure 8:
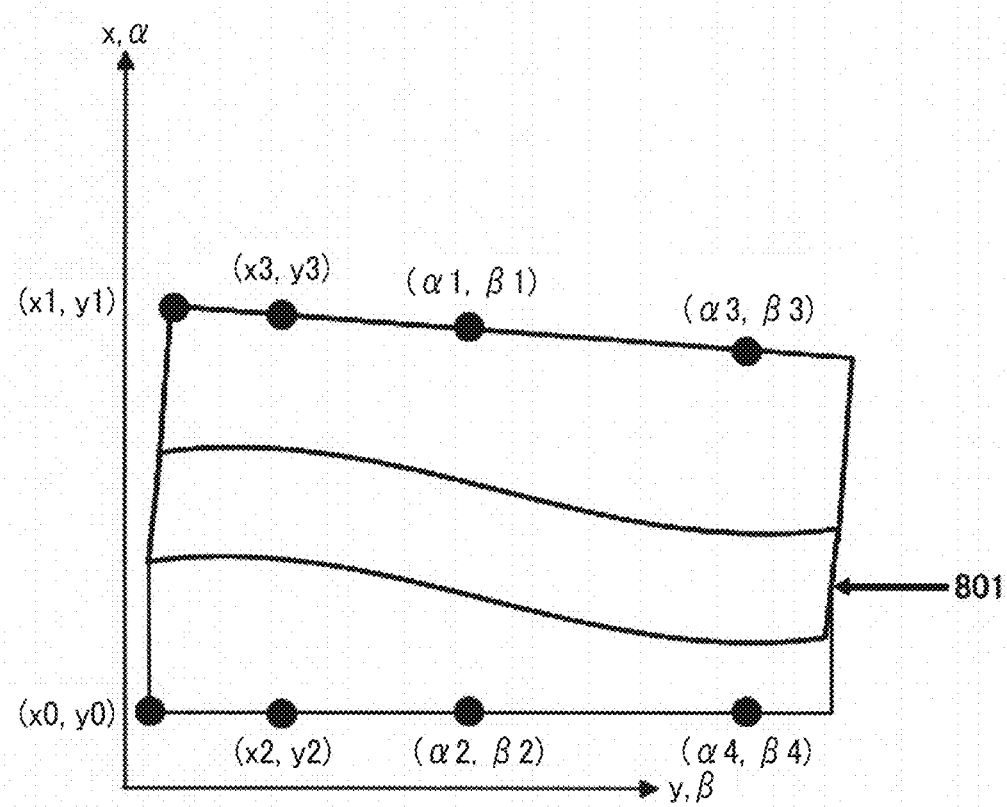
FIG. 8 is a diagram illustrating a sheet on which a method of determining a sheet edge folding is performed after determination of sheet wrinkles.

FIG. 8 is a diagram illustrating a sheet P on which a method of determining a sheet edge folding is performed after determination of sheet wrinkles.

In FIG. 8, the image controller 100 determines that a wrinkle 801 has occurred when the expression of $(\beta1-\beta3)\neq(\beta2-\beta4)$ is satisfied. Then, when it is determined that the wrinkle 801 has not occurred, the image controller 100 further determines whether the expression of $(x2-x0):(x3-x1)\neq(y0-y2):(y1-y3)$ is satisfied. When it is determined that the expression is satisfied, the image controller 100 determines that the sheet edge folding has occurred. Accordingly, the above-described determinations in a two-step manner distinguishes whether the abnormality is a sheet defect including a sheet edge folding or a sheet defect including sheet wrinkles.

Further, as described below, a defect determination mode may be selectable for determining a defect on a sheet P.

Figure 9:
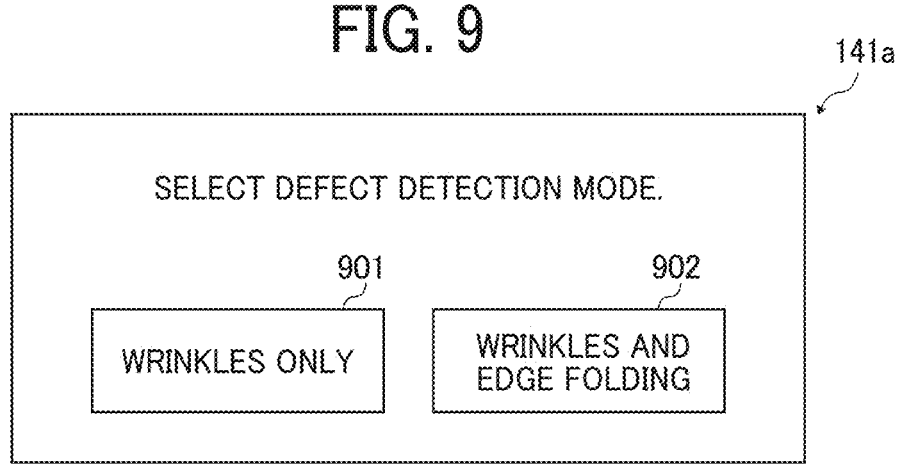
FIG. 9 is a diagram illustrating an example of a setting screen for detecting a defect determination mode.

FIG. 9 is a diagram illustrating an example of a setting screen 141*a* for detecting a defect determination mode.

As illustrated in FIG. 9, a user can select a defect determination mode from two types of detect determination modes, that is, a first determination mode 901 in which it is determined whether there are sheet wrinkles alone and a second determination mode 902 in which it is determined whether there are both sheet wrinkles and sheet edge folding, via the setting screen 141*a* of the control panel 140. For a user who cuts a margin portion of a printed document, a sheet edge folding at the corner of a sheet is not a serious problem in many cases. In such cases, the user can select a mode for determining sheet wrinkles alone ("sheet wrinkles" button in FIG. 9) by pressing the mode button on the setting screen 141 on the control panel 140. By so doing, wrinkles on the sheet P are detected with higher accuracy to determine the defects. When the second determination mode 902 is selected by pressing a mode button ("sheet wrinkles and sheet edge folding" button in FIG. 9) on the setting screen 141 of the control panel 140, it is first determined whether there are wrinkles on the sheet P, and it is then determined whether there is a sheet edge folding. Alternatively, even though it is not particularly illustrated in FIG. 9, a mode for determining a sheet edge folding alone may be provided, so that the user can select the mode by pressing a mode button (for example, "sheet edge folding" button).

Further, a description is given of the control for changing the ejection destination of the sheet P according to the determination result. The image controller 100 changes the ejection destination of a sheet P between a case when it is determined that there are wrinkles on a sheet P and a case when it is determined that there is a sheet edge folding on a sheet P. For example, when it is determined that there are wrinkles on a sheet P, the image controller 100 causes the sheet P to be ejected to the second sheet ejection unit 32 of the post-processing apparatus 30. By contrast, when it is determined that there is a sheet edge folding on a sheet P, the image controller 100 causes the sheet P to be ejected to the first sheet ejection unit (tray) 31 of the post-processing apparatus 30. When a user visually confirms the degree of defect of the sheet P that is determined as a defective sheet P, the user easily finds the sheet P determined as a defective sheet by separating a sheet ejection tray for a sheet P having wrinkles and a sheet ejection tray for a sheet P having a sheet edge folding. Further, since the sheet ejection tray to which the sheet P is ejected is different depending on the type of defect, the user easily grasp the number of sheets P for each defect. The image controller 100 may display such a change or setting of the ejection destination of the sheet P on a setting screen in the similar manner to the setting screen 141*a* for selecting the mode illustrated in FIG. 9 to allow a user to select the ejection destination. Further, in addition to the case in which there are wrinkles on a sheet P and the case in which there is a sheet edge folding on the sheet P, when it is determined that both sheet wrinkles and a sheet edge folding are generated, the image controller 100 may change the ejection destination of the sheet P so that the ejection destination of the sheet P having both wrinkles and sheet edge folding may be different from the ejection destinations of the sheet P having wrinkles alone and the sheet P having a sheet edge folding alone.

Further, when it is determined that there are wrinkles on a sheet P, the image controller 100 may change the fixing conditions (for example, the fixing temperature and the fixing pressure).

Figure 10:
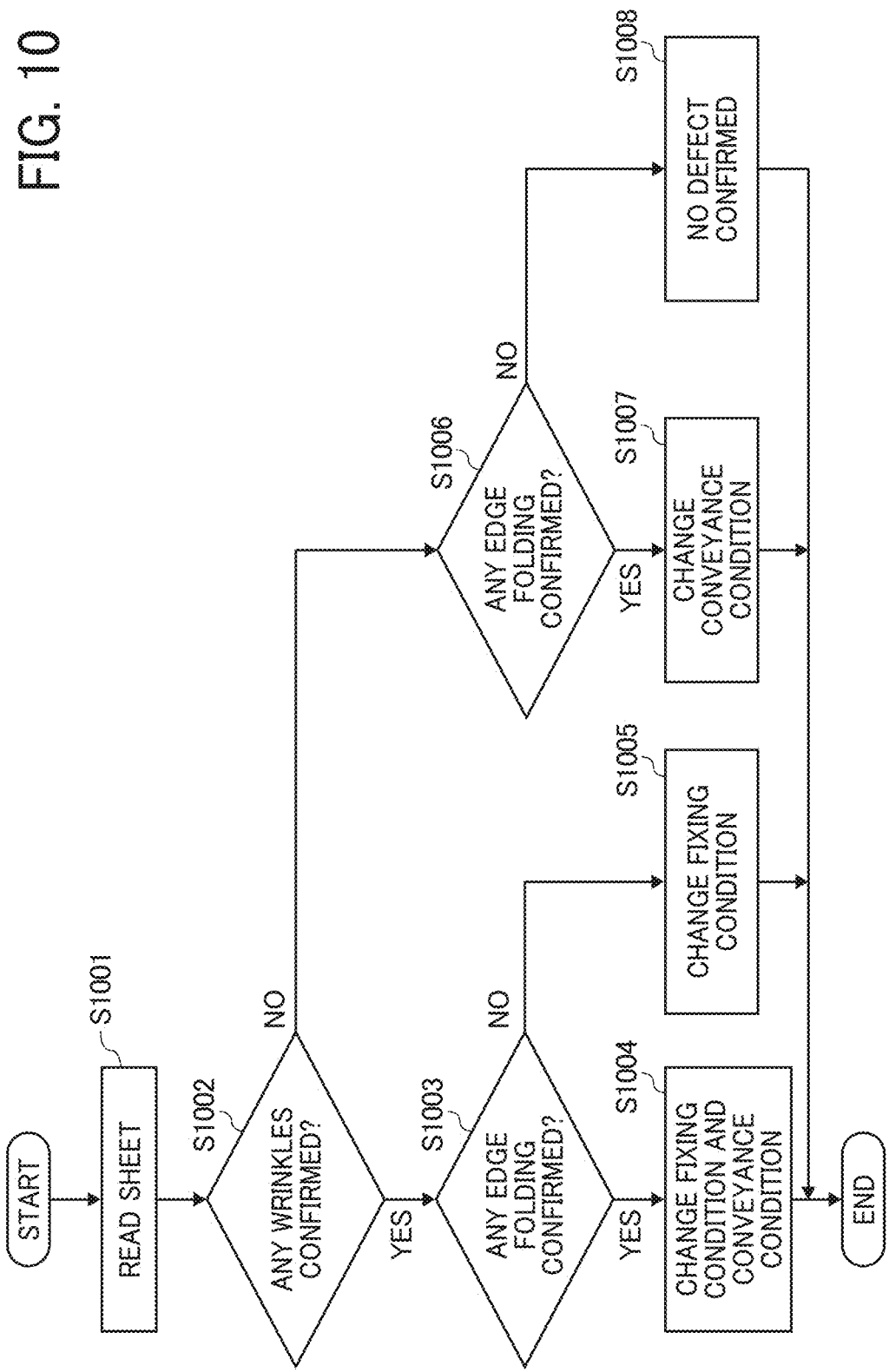
FIG. 10 is a flowchart of a process procedure for setting a conveyance condition and a fixing condition.

FIG. 10 is a flowchart of a process procedure for setting a conveyance condition and a fixing condition.

As illustrated in FIG. 10, when a sheet P is read (S1001), the image controller 100 determines whether the sheet P is wrinkled (S1002). When the sheet P is wrinkled (YES in S1002), the image controller 100 further determines whether the sheet P has a sheet edge folding (S1003). When the sheet P has a sheet edge folding (YES in S1003), both the sheet wrinkles and the sheet edge folding are generated. Due to this condition, the image controller 100 changes the fixing condition (for example, the fixing temperatures and the fixing pressures), and further changes the conveyance condition (for example, the rotation speeds of conveyance rollers) (S1004). As described above, when it is determined that both the sheet wrinkles and the sheet edge folding are generated, both the fixing condition and the conveyance condition are changed. By changing the fixing condition (for example, the fixing temperatures and the fixing pressures), occurrence of wrinkles of subsequent sheets are reduced. In addition, by changing the conveyance condition (for example, the rotation speeds of the conveyance rollers), occurrence of sheet edge folding of the subsequent sheets are reduced. Specifically, the rotation speed of the conveying roller is set in advance for each sheet feed tray. When a sheet edge folding is generated on the sheet P, the rotation speed of the conveying roller is reduced to prevent another sheet edge folding from occurring on each subsequent sheet P.

When it is determined that there is no sheet edge folding (NO in S1003), the image controller 100 determines that sheet wrinkles alone have occurred, and then changes the above-described fixing conditions (such as the fixing temperature and the fixing pressure) to reduce occurrence of wrinkles of the subsequent sheets (S1005).

In addition, when it is determined that there is no sheet wrinkles (NO in S1002), the image controller 100 further determines whether there is a sheet edge folding (S1006). When it is determined that there is a sheet edge folding (YES in S1006), the image controller 100 changes the above-described conveyance condition (such as the rotational speed of the conveying roller) to reduce occurrence of sheet edge folding of the subsequent sheets (S1007).

On the other hand, when it is determined that there is no sheet edge folding (NO in S1006), the image controller 100 determines that there is no defect in the sheet (S1008). The above-described conditions may be automatically changed by an adjustment amount determined based on a table set in advance in the apparatus or device or may be changed by a user inputting the adjustment amount through the control panel 140.

Furthermore, the above-described fixing conditions and conveying conditions may be selected, set, or changed according to the sheet type or the environmental conditions. When the sheet wrinkles, the sheet edge folding, or both are determined, the image controller 100 automatically or manually records the fixing condition and the conveying condition at the time of the determination, in a storage unit such as a memory. In addition, as described below, when the fixing condition and the conveyance condition are changed along with the determination of the sheet wrinkles, the sheet edge folding, or both, the image controller 100 automatically or manually records the changed fixing condition and the changed conveyance condition in the storage unit such as a memory. Then, when a subsequent print job is executed, the image controller 100 detects the temperature and humidity and the sheet type of each sheet feed tray, calls the fixing condition and the conveyance condition recorded corresponding to the sheet type, and presents information for prompting a user to determine whether to reflect the conditions at the time of printing.

Figure 11:
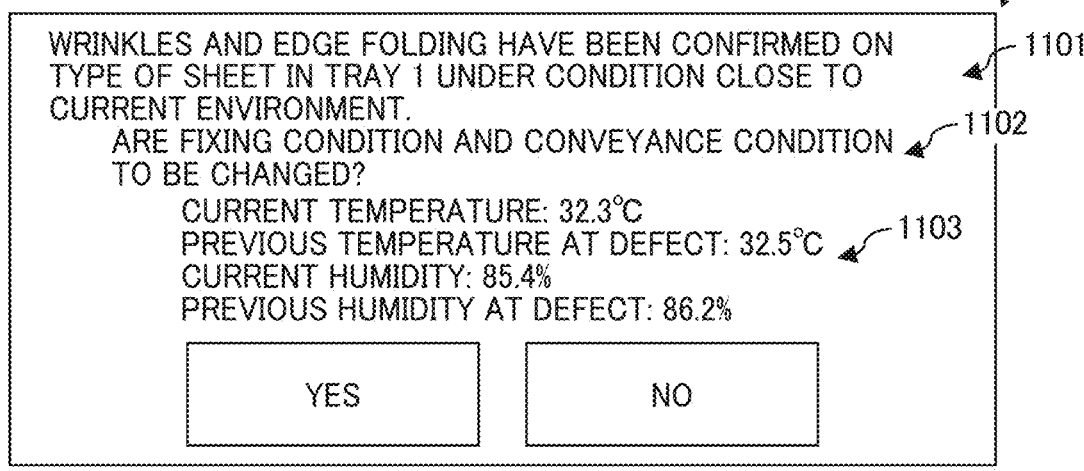
FIG. 11 is a diagram illustrating an example of a screen for receiving selection, setting, and change of the fixing condition and the conveyance condition in accordance with the sheet type and the environmental condition.

FIG. 11 is a diagram illustrating an example of the setting screen 141a for receiving selection, setting, and change of the fixing condition and the conveyance condition described above, in accordance with the sheet type and the environmental condition.

As illustrated in FIG. 11, the image controller 100 determines the sheet type of the sheet P contained in the sheet feed tray based on the type of the sheet feed tray. When printing a sheet P having the same sheet type as the determined sheet type, the image controller 100 reads out the fixing condition and the conveyance condition recorded when it was determined that there was the sheet wrinkles, the sheet edge folding, or both, from the storage unit such as a memory, and then displays the fixing condition and the conveyance condition on the setting screen 141a of the control panel 140. Further, the image controller 100 displays, on the setting screen 141a of the control panel 140, the current temperature and humidity around the image forming apparatus 10 (of the image forming system 1000) at the time of printing a sheet of the same sheet type described above and the previous temperatures and humidity around the image forming apparatus 10 (of the image forming system 1000) when it was determined that there were the sheet wrinkles, the sheet edge folding, or both at the time of printing a sheet P of the same sheet type, and compares the current temperature and humidity and the previous temperatures and humidity. The image controller 100 compares both of the current temperature and humidity and the previous temperatures and humidity, picks up the previous temperatures and humidity approximate to the current temperature and humidity by a certain extent, and displays the previous temperatures and humidity in the order of approximation close images and displays the images that approximate to each other by a certain degree or more on the setting screen 141a of the control panel 140 preferentially in the order of a closer approximation to the current temperature and humidity. The temperature and humidity around the image forming apparatus 10 (of the image forming system 1000) may be measured by a sensor such as a detection unit 150 illustrated in FIG. 1 or a thermohygrometer provided in the housing of the image forming apparatus 10 (of the image forming system 1000) or may be obtained by receiving a measurement result from a sensor or a thermohygrometer provided outside the housing of the image forming apparatus 10 (of the image forming system 1000) via a communication device by e.g., radio.

In FIG. 11, when a sheet P of the sheet type for a sheet feed tray 1 (TRAY 1) is currently printed under an environment close to the current temperature and humidity by a certain amount or more, the image controller 100 displays information 1101 and information 1102. The information 1101 indicates that sheet wrinkles, sheet edge folding, or both have occurred before. The information 1102 indicates that the fixing condition and the conveyance condition are prompted to be changed. Together with the information 1101 and the information 1102, the image controller 100 further displays information 1103 indicating the current temperature and humidity and the previous temperature and humidity closest to the current environment (temperature and humidity). The display of the setting screen 141a illustrated in FIG. 11 indicates that sheet wrinkle, sheet edge folding, or both have occurred, for example, when a sheet of the sheet type for the sheet feed tray 1 is printed in the past at a temperature of 32.5 degrees Celsius (° C.) and a humidity of 86.2%.

Figure 12:
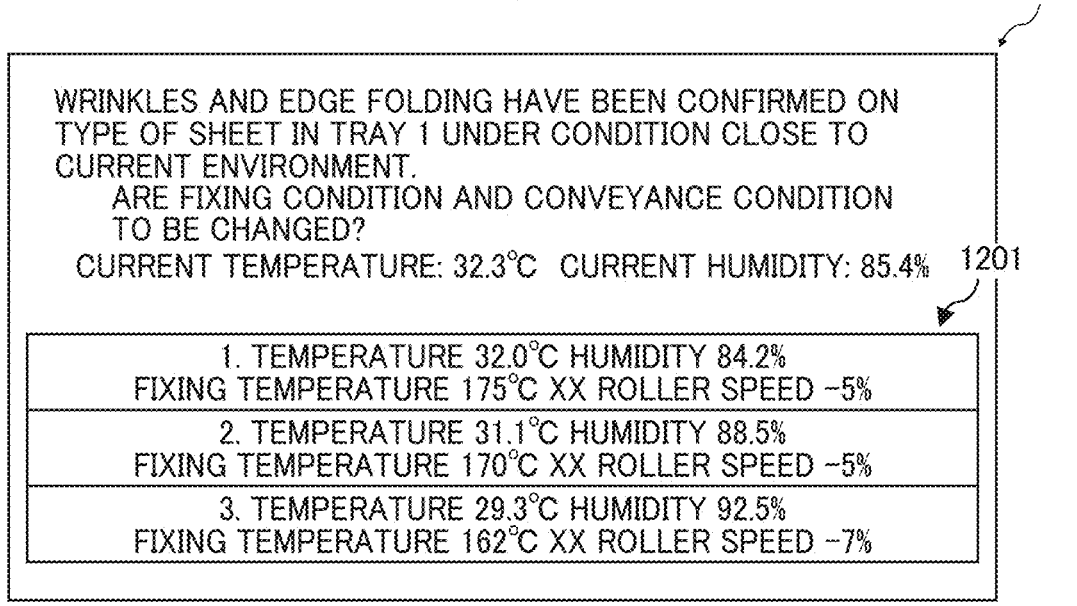
FIG. 12 is a diagram illustrating another example of a screen for receiving selection, setting, and change of the fixing condition and the conveyance condition in accordance with the sheet type and the environmental condition.

FIG. 12 is a diagram illustrating another example of a screen for receiving selection, setting, and change of the fixing condition and the conveyance condition in accordance with the sheet type and the environmental condition.

In FIG. 11, information indicating the previous temperature and humidity closest to the current environment (temperature and humidity) is displayed. However, as illustrated in FIG. 12, multiple possible conditions (three conditions 1201 in FIG. 12) may be displayed in the order from the closest condition of the previous temperatures and humidity when a print job is executed under an environment close to the current temperature and humidity. Further, the image controller 100 may display a conveyance condition such as a roller speed and a fixing condition such as a fixing temperature at the time of the print job in association with each of the multiple possible conditions displayed on the screen. In FIG. 12, three conditions 1201 are selected from the conditions closest to the current environment (temperature and humidity) and displayed on the setting screen 141a of the control panel 140 in association with the multiple possible conditions. FIG. 12 illustrates a case of a print job executed on a sheet of the sheet type for the sheet feed tray 1 (TRAY 1) at the current temperature of 32.3° C. and the current humidity of 85.4%. The image controller 100 reads out, from the storage unit such as the above-described memory, the top three temperatures and humidity close to the current temperature and humidity by a certain amount or more, among the temperatures and humidity at the time of occurrence of sheet wrinkles, sheet edge folding, or both have occurred on the sheet of the sheet types for the sheet feed tray 1 printed in the past. Then, the image controller 100 displays them on the setting screen 141a of the control panel 140. The image controller 100 further displays, in association with the temperature and the humidity, a fixing condition and a conveyance condition that are changed automatically or manually so as not to cause sheet wrinkles, sheet edge folding, or both on a sheet when the print job is executed at the temperature and the humidity. The display in FIG. 12 indicates that, for example, when a sheet of the sheet type for the sheet feed tray 1 was printed at a temperature of 32.0° C. and a humidity of 84.2% in the past, sheet wrinkles, sheet edge folding, or both have occurred, and the fixing temperature was changed to 175° C. as the fixing condition and the rotational speed of an XX roller (corresponding roller) was changed by −5% as the conveyance condition due to the occurrence of the defect.

Note that, in FIG. 11, the above-described information 1101 to 1103 are displayed, so as to allow a user to select whether to change the conveyance condition or the fixing condition by pressing any one of the "YES" button or the "No" button. However, as illustrated in FIG. 12, when the print job is executed at the temperature and the humidity, the image controller 100 may display a fixing condition and a conveyance condition that are automatically or manually changed so as not to cause sheet wrinkles, sheet edge folding, or both on the sheet, on the setting screen 141a of the control panel 140, together with the information 1101 to 1103.

As illustrated in FIGS. 11 and 12, since a user confirms the information (e.g., the information 1101 to 1103) displayed on the control panel 140 by the image controller 100, the user becomes aware of possible occurrence of sheet wrinkles or sheet edge folding to the sheet to be printed under the current environment. In response to the confirmation, the fixing condition and the conveyance condition displayed on the setting screen 141a of the control panel 140 are changed to prevent sheet wrinkles or sheet edge folding from occurring in the sheet to be printed. In the above-described example, the same sheet types of the sheets are printed. However, the display on the setting screen 141a illustrated in FIG. 11 and the display on the setting screen 141a illustrated in FIG. 12 may be displayed in a case where sheets of similar sheet types such as sheets of similar sheet materials or sheets including a common material (for example, thin papers) are set.

As described above, the configuration (e.g., of the image inspector 1500) according to the present embodiment includes a reading device (for example, the image reading device 20) that reads an image on a recording medium (sheet P) to be conveyed, and an image controller (for example, the image controller 100) that determines whether there are wrinkles and sheet edge folding of the recording medium based on the fact that a plurality positions on the image on the recording medium read by the reading device satisfies a predetermined relation (for example, the expressions illustrated in FIGS. 7 and 8). Based on the predetermined relations described above, the image controller 100 determines whether there are sheet wrinkles on the recording medium, and then determines whether there is a sheet edge folding on the recording medium. Due to such a configuration, when an abnormality occurs, whether the sheet edge folding has occurred, or the sheet wrinkles have occurred is distinguished. Currently, one of sheet edge folding and sheet wrinkles is detected. However, the configuration according to the present embodiment detects both abnormalities simultaneously and distinguishes these abnormalities, i.e., the sheet edge folding and the sheet wrinkles, as described above. Then, when the sheet wrinkles alone occur, the configuration according to the present embodiment prevents false determination as sheet edge folding. As a result, a defect is detected with higher accuracy.

In addition, an operation unit (for example, the control panel 140) is provided for selecting a first determination mode to determine sheet wrinkles of the recording medium (for example, the first determination mode 901 in which sheet wrinkles alone are determined) and a second determination mode to determine both sheet wrinkles and a sheet edge folding of the recording medium (for example, the second determination mode 902 in which both sheet wrinkles and a sheet edge folding are determined). In a case where a recording medium as a printed document is to be cut, the recording medium is cut off, and thus the sheet edge folding may not be a serious problem. On the other hand, sheet wrinkles remain on the recording medium, and thus this abnormality is a problem. As described above, the determination mode is switchable depending on how the recording medium is handled after the print job.

In addition, as described with reference to FIG. 9, the image controller changes the ejection destination of the recording medium depending on whether the recording medium is determined to have the sheet wrinkle or the sheet edge folding. By changing the ejection destination as described above, when the degree of defect of a recording medium is visually determined, the user easily finds the recording medium (sheet) determined as a defective sheet.

In addition, as described with reference to FIG. 10, the image controller changes the conveyance condition of the recording medium, the fixing condition of the recording medium, or both for each type of the recording medium, depending on whether the recording medium is determined to have the sheet wrinkle, the sheet edge folding, or both the sheet wrinkles and the sheet edge folding. Due to such control, occurrence of the same phenomenon in the subsequent print job is prevented. Several patterns of these conditions are stored in advance, so that any pattern may be selected from the stored patterns. For example, when a sheet edge folding occurs, the rotational speed of a specific roller may be decreased.

As described with reference to FIGS. 11 and 12, the image forming apparatus (for example, the image forming apparatus 10) includes a detection unit (for example, the detection unit 150) that measures an environmental condition including a temperature around the image inspector 1500, a humidity around the image inspector 1500, or both of the temperature and the humidity. The image controller (for example, the image controller 100), for each type of the recording medium, records (stores) the environmental condition in association with a printing condition including a conveyance condition of the recording medium, a fixing condition of the recording medium, or both, in the storage unit such as the memory, in association with a case where the recording medium is determined to have the sheet wrinkles, a case where the recording medium is determined to have the sheet edge folding, and a case where the recording medium is determined to have both the sheet wrinkles and the sheet edge folding, by each type of recording media. The conveyance condition and the fixing condition have been changed by a user so as not to cause the sheet wrinkle or the sheet edge folding. Then, in a case where the environmental condition in the print job of a subsequent recording medium of the same sheet type is close by a certain extent or more to the environmental condition stored in the storage unit, it is notified to a user that at least sheet wrinkles or sheet edge folding are likely to occur on the recording medium. According to such an operation, the user grasps possible occurrence of sheet wrinkles, sheet edge folding, or both in advance when the subsequent recording medium is printed under the current environment, resulting in performance of a good countermeasure such as cancellation of the print job.

In addition, the image controller presents the printing conditions changed so as not cause any one of the sheet wrinkles and the sheet edge folding on the recording medium, to the user. The printing conditions are stored in the storage unit in association with the environmental condition that is close by the certain extent or more to the recorded environmental conditions, together with information indicating that the sheet wrinkles or the sheet edge folding is likely to occur. In this way, by including not only the sheet type but also the environmental conditions as parameters, day-to-day environmental variations are taken into consideration and a print job is prevented under the condition in which sheet wrinkles, a sheet edge folding, or both are highly likely to occur on a recording medium. In addition, the user selects whether or not to reflect, as the printing condition, a setting that does not cause sheet wrinkles or a sheet edge folding on the sheet in the next and subsequent printing operations.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An image inspector comprising:
   at least one reading device configured to capture an image of at least one recording medium; and
   circuitry configured to determine whether the recording medium has at least one defect, the defect being at least one of a wrinkle or a folded edge fold, based on coordinates of at least two locations on at least one edge of the recording medium, the determining including,
   determining whether at least two opposite side edges of the recording medium are parallel to each other based on the coordinates of the at least two locations.

2. The image inspector according to claim 1, wherein the circuitry is further configured to:
   receive an input of an operation for selecting a first mode to determine whether the recording medium includes the wrinkle, or a second mode to determine whether the recording medium includes both the wrinkle and the folded edge.

3. The image inspector according to claim 1, wherein the circuitry is further configured to:
   change an ejection destination of the recording medium based on results of the wrinkle determination or the results of the folded edge determination.

4. The image inspector according to claim 1, wherein the circuitry is further configured to:
   change at least one of a conveyance condition of the recording medium or a fixing condition of the recording medium, for each type of recording mediums, based on results of the determining the at least one defect of the recording medium.

5. The image inspector according to claim 1, further comprising:
   an environmental detection sensor configured to measure an environmental condition including at least one of a temperature around the image inspector, and a humidity around the image inspector; and
   in response to results of the determining the at least one defect of the recording medium, the circuitry is further configured to,
   for each type of recording medium, record the environmental condition in association with a printing condition including a conveyance condition of the recording medium, a fixing condition of the recording medium, or both, changed so as not to cause the wrinkle or the folded edge; and
   notify that at least one of the wrinkle or the folded edge is likely to occur on the recording medium in a case where an environmental condition in a print job of a subsequent recording medium of a same sheet type is greater than a desired threshold value to the recorded environmental condition.

6. The image inspector according to claim 5, wherein the circuitry is configured to:
   present the printing condition that is changed; and
   record the changed printing condition in association with the environmental condition that is greater than the desired threshold value to the recorded environmental condition, together with information indicating that the wrinkle or the folded edge is likely to occur on the recording medium.

7. An image forming system comprising:
   the image inspector according to claim 1; and an image forming apparatus configured to form at least one image on the recording medium.

8. The image inspector according to claim 1, wherein the circuitry is further configured to:
adjust at least one printing condition based on results of the determine whether the recording medium has the at least one defect.

9. The image inspector according to claim 8, wherein the at least one printing condition includes at least one of a fixing pressure setting, a fixing temperature setting, or any combinations thereof.

10. The image inspector according to claim 1, wherein the circuitry is further configured to:
determine a number of sheets including at least one defect; and
stop output of the sheets based on the determined number and a desired defect threshold value.

11. The image inspector according to claim 1, wherein the circuitry is further configured to determine whether the recording medium has at least one defect by:
determining whether a continuous density change is present in a conveyance direction of the recording medium.

12. A method of operating an image inspector comprising:
capturing an image of at least one recording medium; and
determining whether the recording medium has at least one defect based on coordinates of at least two locations on at least one edge of the recording medium, the defect being at least one of a wrinkle or a folded edge fold, the determining including,
determining whether at least two opposite side edges of the recording medium are parallel to each other based on the coordinates of the at least two locations.

13. The method according to claim 12, further comprising:
receiving an input of an operation for selecting a first mode to determine whether the recording medium includes the wrinkle, or a second mode to determine whether the recording medium includes both the wrinkle and the folded edge.

14. The method according to claim 12, further comprising:
changing an ejection destination of the recording medium based on results of the wrinkle determination or the results of the folded edge determination.

15. The method according to claim 12, further comprising:
changing at least one of a conveyance condition of the recording medium or a fixing condition of the recording medium, for each type of recording mediums, based on results of the determining the at least one defect of the recording medium.

16. The method according to claim 12, further comprising:
measuring an environmental condition including at least one of a temperature around the image inspector, and a humidity around the image inspector; and
in response to results of the determining the at least one defect of the recording medium,
for each type of recording medium, recording the environmental condition in association with a printing condition including a conveyance condition of the recording medium, a fixing condition of the recording medium, or both, changed so as not to cause the wrinkle or the folded edge; and
notifying that at least one of the wrinkle or the folded edge is likely to occur on the recording medium in a case where an environmental condition in a print job of a subsequent recording medium of a same sheet type is greater than a desired threshold value to the recorded environmental condition.

17. The method according to claim 12, further comprising:
adjusting at least one printing condition based on results of the determine whether the recording medium has the at least one defect.

18. The method according to claim 17, wherein the at least one printing condition includes at least one of a fixing pressure setting, a fixing temperature setting, or any combinations thereof.

19. An image forming system comprising:
an image forming apparatus configured to form at least one image on at least one recording medium;
at least one reading device configured to capture at least one inspection image of the at least one recording medium; and
circuitry configured to determine whether the recording medium has at least one defect, the defect being at least one of a wrinkle or a folded edge fold, based on coordinates of at least two locations on at least one edge of the recording medium, the determining including,
determining whether at least two opposite side edges of the recording medium are parallel to each other based on the coordinates of the at least two locations.

20. The image forming apparatus according to claim 19, wherein
the at least one reading device is downstream from the image forming apparatus in a conveyance direction of the recording medium and is connected to the image forming apparatus; and
the image forming system further includes a post-processing apparatus downstream of the at least one reading device in the conveyance direction of the recording medium, the post-processing apparatus configured to perform at least one post-processing operation on the recording medium.

* * * * *